US006263741B1

(12) United States Patent
Woias

(10) Patent No.: US 6,263,741 B1
(45) Date of Patent: Jul. 24, 2001

(54) MICROMECHANICALLY PRODUCED FLOW-RESTRICTION DEVICE

(75) Inventor: Peter Woias, München (DE)

(73) Assignee: Fraunhofer-Gesellschaft zur Förderung der Angewandten Forschung E.V. (DE)

( * ) Notice: Subject to any disclaimer, the term of this patent is extended or adjusted under 35 U.S.C. 154(b) by 0 days.

(21) Appl. No.: 09/319,169

(22) PCT Filed: Nov. 13, 1997

(86) PCT No.: PCT/EP97/06342

§ 371 Date: Jun. 1, 1999

§ 102(e) Date: Jun. 1, 1999

(87) PCT Pub. No.: WO98/25110

PCT Pub. Date: Jun. 11, 1998

(30) Foreign Application Priority Data

Dec. 3, 1996 (DE) .............................................. 196 50 116
Jan. 28, 1997 (DE) .......................................... 297 01 418 U

(51) Int. Cl.$^7$ ................................. G01F 1/38; G01L 7/08
(52) U.S. Cl. .......................................... 73/861.47; 73/715
(58) Field of Search ............................ 73/715, 718, 724, 73/754, 756, 861.42, 861.47, 861.48

(56) References Cited

U.S. PATENT DOCUMENTS

| 4,479,070 | * | 10/1984 | Frische et al. ........................ 310/338 |
| 5,082,242 | * | 1/1992 | Bonne et al. .................... 251/129.01 |
| 5,316,619 | * | 5/1994 | Mastrangelo ........................... 156/644 |
| 5,377,524 | * | 1/1995 | Wise et al. .............................. 73/4 R |

OTHER PUBLICATIONS

A Differential Pressure Liquid Flow Sensor for Flow Regulation and Dosing Systems, M. A. Boillat, et al., Jan. 1995, IEEE, pp. 350–352.*

Designing, realization and characterization of a novel capacitive presure/flow sensor, R.E. Oosterbroek, et al., Jun. 1997, IEEE, pp. 151–154.*

* cited by examiner

Primary Examiner—Benjamin R. Fuller
Assistant Examiner—Corey D. Mack
(74) Attorney, Agent, or Firm—Beyer Weaver & Thomas, LLP

(57) ABSTRACT

A micromechanically produced flow-restriction device has a first passage opening formed in a first main surface of a substrate. A channel is formed in a second main surface of the substrate and one end thereof is in fluid communication with the first passage opening. A second passage opening is in fluid communication with a second end of the channel. The first passage opening, the channel and the second passage opening define a flow path. A membrane is formed in the substrate and is in fluid communication with the first passage opening. A membrane electrode is formed at least on the membrane. A cover is attached to the second main surface of the substrate in such a way that the cover defines together with the channel a flow resistance of the flow-restriction device, the cover being provided with a counter-electrode which is arranged in opposed, spaced relationship with the membrane electrode in such a way that the membrane electrode and the counterelectrode define a capacitive pressure sensor, the capacitive pressure sensor being arranged on a wall of the flow path.

13 Claims, 1 Drawing Sheet

MICROMECHANICALLY PRODUCED FLOW-RESTRICTION DEVICE

BACKGROUND OF THE INVENTION

1. Field of the Invention

The present invention relates to a flow-restriction device and especially to a micromechanically produced flow-restriction device.

2. Description of Prior Art

Micromechanically produced fluid passages are known e.g. in the field of fluid dosage. A simple dosing system consists e.g. of a fluid reservoir, a pressure transducer and a fluid passage having a defined flow resistance.

In addition, micromechanically produced multisensors for flow, temperature and pressure measurements are known in the field of technology. Such systems are provided with a micro-mechanical capillary on the back of a substrate and with piezoelectric pressure sensors arranged on the front of a substrate. Such known systems are disadvantageous insofar as they are difficult to produce and, in addition, insofar as the piezoelectric pressure sensors are very expensive.

DD-A-285188 discloses a flow sensor provided with a capillary and used for continuous measurements of gas volume flows. In this known flow sensor, a differential pressure between an inlet reservoir and an outlet reservoir is caused by a pressure drop via a capillary. This differential pressure is detected by means of a membrane provided with a resistance bridge which is adapted to be unbalanced, and is then used as a measure of a gas volume stream.

In the Patent Abstracts of Japan, Sect. P, Vol. 17 (1993), No. 550 (P-1624), a flow rate detection element is described, which is provided with a small channel, a pressure detection element being arranged within the walls of said channel. The pressure detected serves to control the fluid flow rate, whereby a fine control of the transport speed of the fluid can be achieved.

The publication "Einsatz von Siliziumsensoren in Prozeßmeß-geräten zur Druckmessung—Stand und Tendenzen", Technisches Messen 59 (1992) 9, pp. 340–346, contains an explanation of piezoresistive and capacitive silicon sensors and their fields of application.

EP-A-0435237 describes an electronic microvalve consisting of a silicon substrate and a freestanding, flexible, dielectric closure plate, a space being arranged between the closure plate and the silicon substrate. The silicon substrate is provided with an inlet opening, whereas the closure plate has provided therein outlet openings in such a way that said closure plate leaves the inlet opening open in a non-excited state and closes said inlet opening in an excited state.

DE-A-3814150 also refers to a valve arrangement consisting of microstructured components. In this valve arrangement, an actuating element is adapted to be moved relative to a flow path distributor for thus opening or closing fluid paths depending the respective switching position.

U.S. Pat. No. 5,377,524 discloses a microflow measurement device which makes use of a capacitive pressure sensor. In the known pressure measurement device, an inlet opening and an outlet opening are provided in a carrier plate. The carrier plate has a structured substrate arranged thereon. Said substrate is structured such that it defines, on the one hand, a channel together with the carrier plate and, on the other hand, a capacitive pressure sensor together with the carrier plate. The channel is implemented such that it defines a flow resistance. The capacitive pressure sensor is defined by a membrane and an associated membrane electrode as well as by a counterelectrode arranged on the carrier plate in spaced relationship with said membrane electrode. According to U.S. Pat. No. 5,377,524, the capacitive pressure sensor is arranged outside of the flow path, viz. in a lateral branch, so as to permit the measurement of a pressure difference between the pressure prevailing at the inlet opening and the pressure prevailing at the outlet openig.

In Boillat, M. A. et al: "A Differential Pressure Liquid Flow Sensor for Flow Regulation and Dosing Systems", PROC. IEEE MICRO ELECTROC MECHANICAL SYSTEMS 1995, 29.1.95-2.2.95, NL-Amsterdam, pp. 350–352, a flow sensor is described in the case of which two piezoresistive low-pressure sensors are provided for detecting the pressure in the flow path in front of and behind a channel constituting a flow-restriction.

SUMMARY OF THE INVENTION

It is the object of the present invention to provide an economy-priced and simple micromechanically produced flow-restriction device with at least one integrated pressure sensor.

In accordance with the present invention, this object is achieved by a micromechanically produced flow-restriction device comprising:

a first passage opening formed in a first main surface of a substrate;

a channel which is formed in a second main surface of the substrate and one end of which is in fluid communication with said first passage opening;

a second passage opening which is in fluid communication with a second end of the channel, said first passage opening, said channel and said second passage opening defining a flow path, a membrane which is formed in the substrate and which is in fluid communication with said first passage opening;

a membrane electrode formed at least on said membrane;

a cover attached to the second main surface of the substrate in such a way that said cover defines together with said channel a flow resistance of the flow-restriction device, said cover being provided with a counterelectrode which is arranged in opposed, spaced relationship with said membrane electrode in such a way that said membrane electrode and said counterelectrode define a capacitive pressure sensors said capacitive pressure sensor being arranged on a wall of the flow path.

In a preferred embodiment of the present invention, the second passage opening or outlet opening is formed in the first main surface of the substrate, said second passage opening or outlet opening being in fluid communication with a second membrane which is formed in the substrate and which is provided with a membrane electrode. The cover is provided with a second counterelectrode which is arranged in opposed, spaced relationship with said second membrane electrode in such a way that said second membrane electrode and said second counterelectrode define a capacitive pressure sensor. It follows that, in the case of this embodiment, the micromechanically produced structure is provided with a flow-restriction device and two pressure sensors, one of said pressure sensors being formed in front of the channel defining the flow resistance, when seen in the direction of flow, whereas the other pressure sensor is formed behind the channel defining the flow resistance, when seen in the direction of flow.

In the micromechanically produced flow-restriction device according to the present invention, the cover serves to define the restriction of the flow-restriction device and it also serves as a counterelectrode of the at least one pressure sensor which is implemented as a capacitive sensor. Hence, only two chip components, viz. the substrate and the cover, are required. Preferably, the cover as well as the substrate are produced from silicon, another possibility being, however, to use Pyrex glass for the cover, said Pyrex glass having the same coefficient of thermal expansion as silicon.

The capacitive sensors formed in the flow-restriction device according to the present invention can be produced at a reasonable price and have a low temperature dependence. It follows that compensation electronics can be dispensed with. The flow measurement chip defined by the micromechanically produced flow-restriction device has preferably no further electronics arranged thereon, since a flow measurement chip of this type is disinfected with gamma rays. Such a gamma radiation would destroy electronics, e.g. MOS-FETs or the like, provided on the chip.

The flow-restriction device according to the present invention can advantageously be used e.g. in a dosing system which works on the overpressure principle. In a further embodiment according to the present invention, a temperature sensor is additionally provided in the area of the channel of the flow-restriction device so that the flow-restriction device according to the present invention in combination with a suitable control device provide the possibility of compensating temperature effects. Furthermore, the dosing rate can be influenced externally in this case. Fields of application for the flow-restriction device according to the present invention comprise medical engineering, e.g. the dosing of drugs, analytical chemistry and reaction engineering, e.g. the precision dosing of chemicals, mechanical engineering, e.g. the dosing of lubricating oils, and biotechnology, e.g. the dosing of nutrient media in fermentation processes.

BRIEF DESCRIPTION OF THE DRAWINGS

In the following, a preferred embodiment of the present invention will be explained in detail making reference to the drawings enclosed, in which.

DESCRIPTION OF PREFERRED EMBODIMENTS OF THE INVENTION

Figure 1:
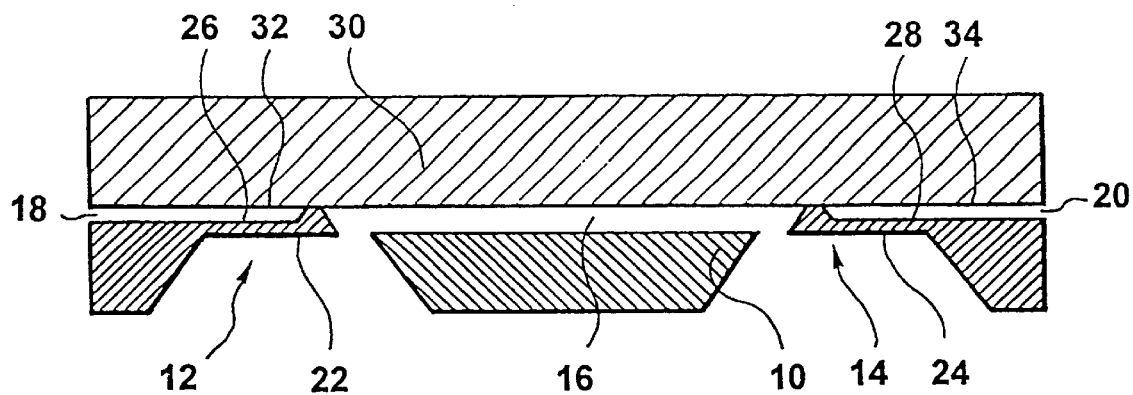
FIG. 1 shows a cross-sectional view of a preferred embodiment of a flow-restriction device according to the present invention.

As can be seen in FIG. 1, the micromechanically produced flow-restriction device according to the present invention includes a substrate 10 consisting of silicon in the case of the preferred embodiment. The main surface of the substrate 10, which is directed downwards in FIG. 1, has formed therein an inlet opening 12 and an outlet opening 14. The second main surface of the substrate 10, which is the upper surface in the representation of FIG. 1, has a recess 16 formed therein, which defines the channel of the flow-restriction device. The recess 16 is formed in the substrate in such a way that it is connected to the inlet opening 12 and the outlet opening 14, said connection serving as a fluid connection between the inlet opening 12 and the channel 16 as well as between the channel 16 and the outlet opening 14 when the component is used later on.

In the embodiment shown in FIG. 1, the second main surface of the substrate 10 has additionally defined therein two recesses 18 and 20, at least part of said recesses being arranged in opposed relationship with the inlet opening 12 and the outlet opening 14. The part of the substrate 10 remaining between the recess 18 and the inlet opening 12 defines a membrane 22. The part of the substrate 10 remaining between the recess 20 and the outlet opening 14 defines an additional membrane 24. The membrane 22 has a membrane electrode 26 formed thereon. The membrane electrode 26 can be formed e.g. by applying a metallization layer. The membrane 24 has a membrane electrode 28 formed thereon. Also the membrane electrode 28 can be formed e.g. by means of a metallization layer. In addition, an insulating layer can be arranged between the metallization, which defines the electrodes 26 and 28, and the substrate. The membrane electrodes 26 and 28 are preferably extended outwards so as to permit an electric connection thereof.

The second main surface of the substrate 10 has now a cover 30 attached thereto, which, in the area in which the channel 16 is formed in the substrate 10, defines together with said channel 16 the flow resistance of the flow-restriction device. This flow resistance is determined by the cross-sectional area of the channel 16, said cross-sectional area being defined by the lower surface and the two lateral surfaces of the recesses as well as by the lower surface of the cover 30. The lower surface of the cover 30 is additionally provided with two counterelectrodes 32 and 34 which are arranged opposite the membrane electrodes 26 and 28 and in spaced relationship therewith.

In the embodiment shown in FIG. 1, the recesses 18 and 20 in the substrate 10 guarantee that the membrane electrodes and the counterelectrodes are arranged in spaced relationship with one another. Alternatively, the membrane electrodes could, however, be formed on the second main surface of the substrate; in this case, the cover 30 is provided with recesses in the area in which the counterelectrodes 32 and 34 are formed so that a defined distance exists again between the respective membrane electrodes and the counter-electrodes. In addition, it is also possible to provide both the cover 30 and the substrate 10 with recesses for defining the distance between the membrane electrodes and the counterelectrodes.

Also the counterelectrodes 32 and 34 are preferably extended at the side so as to permit an electric connection thereof. In the area of the membranes 22 and 24, the membrane electrodes 26 and 28 and the counterelectrodes 32 and 34 overlap by a defined area at a defined distance from one another so that they define a predetermined capacitance. When a pressurized fluid is now present at the inlet opening 12, the membrane 22 and, consequently, the elastic electrode 26 provided thereon will deform, whereby the capacitance of the electrode arrangement 26 and 32 will be changed. Hence, the pressure at the inlet opening 12 can be determined. In the same way, it is possible to determine the pressure at the outlet opening 14.

Figure 2:
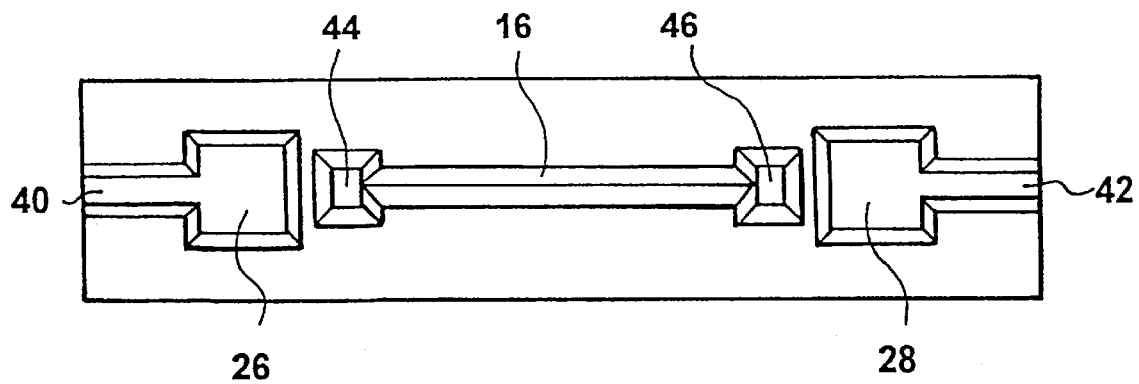
FIG. 2 shows a top view of the flow-restriction device shown in FIG. 1, without a cover.

FIG. 2 shows a top view of the flow-restriction device shown in FIG. 1, the cover being omitted in this case. In FIG. 2 it is shown how the membrane electrodes 26 and 28 are provided with feed lines 40 and 42 which are used for electrically connecting the electrodes with an evaluation circuit or a control means. As can be seen in FIG. 2, the channel 16 of the embodiment shown is triangular in cross-section. However, depending on the production method, said channel can, alternatively, also have a different cross-section, e.g. a trapezoidal cross-section. Also the fluid connection 44 between the inlet opening 12 and the channel 16 as well as the fluid connection 46 between the channel 16 and the outlet opening 14 can be seen in FIG. 2.

The above-described micromechanically produced flow-restriction device can be produced e.g. from silicon by means of conventional micromechanical method steps. In so doing, the openings 12 and 14 are first etched, e.g. by means of KOH etching, into the first main surface of the substrate 10 such that the trapezoidal shape shown in the figure is obtained. In the same way, the channel 16 having a triangular or trapezoidal cross-section and the recesses 18 and 20 are etched into the second main surface of the substrate e.g. by means of KOH etching. The channel 16 as well as the membranes for the pressure sensors are defined in this way. When the recesses 18 and 20 are being etched into the second main surface of the substrate, recesses for the feed lines 40 and 42 are preferably etched at the same time.

Following this, the membrane electrodes are formed in the recesses 18 and 20. The membrane electrodes are preferably formed by the application of a metallization to the surfaces of said recesses 18 and 20; in so doing, the metallization for the feed lines 40 and 42 can be applied simultaneously. Alternatively, the membrane electrodes can be produced on the upper surfaces of the membranes 22 and 24 by suitable doping.

Subsequently, the cover is attached to the upper surface of the substrate 10 by means of conventional chip connection techniques. The cover 30 is attached in such a way that the counterelectrodes 32 and 34 formed on or in the lower surface thereof are arranged in an at least partially overlapping relationship with the membrane electrodes 22 and 24. In the preferred embodiment, the cover 30 also consists of silicon; an advantageous possibility is, however, the use of Pyrex glass for said upper cover 30, since Pyrex glass has the same coefficient of thermal expansion as silicon. When the upper cover consists of silicon, an insulating layer can be arranged between the counterelectrodes 32 and 34 and said upper cover.

In addition to the above-described method of producing the micromechanically produced flow-restriction device according to the present invention, also micromechanical injection moulding methods can be used for producing said device. When these methods are used, the substrate and/or the cover will consist of plastic material; the substrate and the cover can be interconnected by means of suitable known techniques.

Deviating from the above-described preferred embodiment of the present invention, it is also possible that one of the two openings is not formed in the substrate but in the cover. The substrate would then only be provided with an outlet opening, and such a flow-restriction device would also comprise only one pressure sensor which his formed in the manner described hereinbefore.

According to the present invention, the microflow restriction device can also be provided with a coating on all the parts which come into contact with a fluid. The parts coming into contact e.g. with an aggressive fluid are protected against this fluid by said coating. The parts which can be provided with such a protective layer are e.g. the lower surface of the cover in the area of the channel, the channel formed in the substrate, the inlet opening and the outlet opening as well as the membrane surface which cones into contact with the fluid.

The micromechanically produced flow-restriction device according to the present invention can be connected to existing systems by means of known fluidic fittings. For this purpose, a one-part or a multipart housing can be used, which is provided with so-called Luer connection elements and internal fluid passages matching the inlet and outlet geometry of the flow-restriction device. The flow-restriction device is attached to these inlet and outlet openings by a sealing mounting method, e.g. by means of glueing or by mounting with O-rings.

What is claimed is:

1. A micromechanically produced flow-restriction device comprising:

a substrate;

a first passage opening formed in a first main surface of a substrate;

a channel which is formed in a second main surface of the substrate and one end of which is in fluid communication with said first passage opening;

a second passage opening which is in fluid communication with a second end of the channel, said first passage opening, said channel and said second passage opening defining a flow path, a membrane which is formed in the substrate, which is arranged between the first and the second main surface of the substrate, and which is in fluid communication with said first passage opening;

a membrane electrode formed at least on said membrane;

a cover attached to the second main surface of the substrate in such a way that said cover defines together with said channel a flow resistance, said cover being provided with a counterelectrode which is arranged in opposed, spaced relationship with said membrane electrode in such a way that said membrane electrode and said counterelectrode define a capacitive pressure sensor, said capacitive pressure sensor being arranged on a wall of the flow path.

2. A micromechanically produced flow-restriction device according to claim 1, wherein the second passage opening is defined by the cover.

3. A micromechanically produced flow-restriction device according to claim 1, wherein the second passage opening is defined by the substrate.

4. A micromechanically produced flow-restriction device according to claim 3, wherein a further membrane, which is in fluid communication with the second passage opening, is formed in the substrate, at least said further membrane having formed thereon a further membrane electrode, and wherein the cover is provided with a further counterelectrode which is arranged in opposed, spaced relationship with said further membrane electrode in such a way that said further membrane electrode and said further counterelectrode define a further capacitive pressure sensor.

5. A micromechanically produced flow-restriction device according to claim 4, wherein recesses are formed in the second main surface of the substrate such that at least part of said recesses is arranged in opposed relationship with the passage openings in such a way that a respective membrane is defined in the substrate between each of said passage openings and a recess.

6. A micromechanically produced flow-restriction device according to claim 4, wherein the passage openings are formed in the first main surface of the substrate in such a way that the passage openings define the membranes together with the second main surface of the substrate, areas of the cover located opposite the membranes being provided with recesses in which the counterelectrodes are arranged.

7. A micromechanically produced flow-restriction device according to claim 1, wherein the substrate consists of silicon.

8. A micromechanically produced flow-restriction device according to claim 1, wherein the cover consists of silicon.

9. A micromechanically produced flow-restriction device according to claim 1, wherein the cover consists of Pyrex glass.

10. A micromechanically produced flow-restriction device according to claim 1, wherein a temperature sensor is additionally provided in the area of the channel.

11. A micromechanically produced flow-restriction device according to claim 1, wherein the first main surface of the substrate is opposite the second main surface of the substrate.

12. A micromechanically produced flow-restriction device according to claim 1, wherein the first passage opening extends from the first main surface of the substrate to the channel, and wherein the channel extends from the second main surface of the substrate to the first passage opening.

13. A micromechanically produced flow-restriction device according to claim 1, wherein the cover closes the channel so that a fluid only passes through the substrate.

* * * * *